United States Patent Office 3,692,630
Patented Sept. 19, 1972

3,692,630
COMPOSITION FOR PREPARING
PROCESS CHEESE
Thomas P. Kichline, Chesterfield, and Lewis G. Scharpf, Kirkwood, Mo., assignors to Monsanto Company, St. Louis, Mo.
No Drawing. Division of application Ser. No. 843,849, July 22, 1969, now Patent No. 3,635,733, and a continuation-in-part of application Ser. No. 639,306, May 18, 1967. This application May 21, 1970, Ser. No. 48,593
Int. Cl. C07g 7/02; A23c 19/12
U.S. Cl. 195—63                              5 Claims

ABSTRACT OF THE DISCLOSURE

A composition for preparing process cheese comprising an intimate admixture of a process cheese emulsifying agent in an amount of at least 90% of the composition and a proteolytic enzyme from bacterial or fungal source in an amount to provide 1 casein unit of protease activity to about 8,000 casein units of protease activity per gram of emulsifying agent.

---

This application is a division of application Ser. No. 843,849, filed July 22, 1969, now U.S. Pat. 3,635,733 and a continuation-in-part of pending application Ser. No. 639,306, filed May 18, 1967, now abandoned.

The present invention relates to a novel process for preparing an improved pasteurized process cheese. This invention further relates to a pasteurized process cheese process wherein "rework" pasteurized process cheese may be quickly and efficiently reprocessed by utilizing the novel processes of preparing the improved cheese product.

It is well known in the art that pasteurized process cheese is a food product prepared by comminuting and mixing, with the aid of heat, and the addition of a small amount of emulsifying agent usually not exceeding 3% by weight of the total weight of the finished product, one or more natural cheeses (also referred to as cheese stocks or blends) of the same or different varieties.

The term "pasteurized process cheese" used herein means the end cheese product which is derived from the pasteurization of a natural cheese (which is admixed with other ingredients). This term also includes those cheeses which have a certain moisture (water) content such as pasteurized process cheese (for example, process American cheese having 40% water by weight), pasteurized process cheese food (40 to 44% water by weight), and pasteurized process cheese spread (44 to 60% water by weight). These terms and type cheeses are well known in the art and are the standards set up by the Federal Government, note "Cheeses and Cheese Products—Definitions and Standards," Federal Food, Drug and Cosmetic Act, page 27—Reissued on June 26, 1962, United States Code—Title 21, Part 19, which is incorporated herein by reference.

The term "natural cheese" used herein means the final end cheese product which is initially derived from the coagulation of milk or milk products by a milk-curdling agent such as an enzyme like rennet, followed by aging. More specifically, such coagulation produces curds which are then treated, in certain cases, with a salt such as NaCl. The resultant salted curds are then aged, for example, at 30–70° F. for a period of time, for example, 1 month to 6 years, to produce natural cheese.

Many cheese varieties, for example, American, Cheddar, Swiss, Brick, Limburger, etc., are today available in pasteurized process form. In the cooking and preparation of cooked cheese foods, pasteurized process cheese (also referred to as process cheese or pasteurized cheese for the sake of brevity) has many advantages over natural cheese. It melts smoothly and quickly without fat separation or stringiness. Because various types of cheese may be blended together, it is possible to obtain cheese products having balanced flavors and textures. But perhaps the most important characteristic of process cheese is its excellent storage life, that is, stability toward spoilage, rancidity, etc. over a prolonged period of time. Notwithstanding the fact that cheeses of all types have fairly long storage life, they are, nevertheless, perishable in varying degrees. Some varieties, for example, Parmesan, have a long storage life, while others, for example, Camembert, have only a relatively short storage life. The natural ripening process which yields the distinctive cheese flavors and textures does not cease when the cheeses have reached their prime, but on the contrary proceeds until the cheese is no longer suitable for consumption. An additional loss of cheese yield by deterioration or drying out of the cheese has long been a problem to cheese manufacturers.

Much like the milk from which it is produced, cheese is a complex food product. The final acidity of the cheese and the flavor are mainly influenced by the means used to prepare the cheese curd and the curing conditions of the final curd. Some desired qualities of commercial cheeses include smooth texture, high resiliency, softness, moistness, pleasing flavor, and the like. Color, a feature of localized consumer preferences, is easily controlled by the addition of pure vegetable coloring matter to the milk.

It has been estimated that about 55% of the cheese produced in the United States is of the pasteurized process type, and presumably a large portion of this is ultimately utilized in the preparation of cooked cheese dishes. Natural cheese is less suitable for cooking since the fat contained therein tends to separate from the casein when the cheese is subjected to heat. This fat separation is usually prevented in pasteurized process cheese by the use of emulsifying agents, for example, sodium phosphates and sodium citrate. U.S. Pat. Nos. 2,564,374 and 3,244,535 exemplify and typify the various types of emulsifying agents which may be utilized in the preparation of pasteurized process cheese and thus apparently, to some degree, overcome the aforementioned fat separation problem. (It is to be understood, of course, that these patents, which are incorporated herein by reference in order to avoid the enlargement of the present specification, are merely exemplary and there are numerous emulsifying agents which can be utilized in the preparation of pasteurized cheese processes.)

As to pasteurized process cheese per se, the cheese industry is continuously striving to improve the end product as measured, for example, by its smoothness of texture, flavor, meltability, softness, slice separation, and the like. By practicing the novel processes of the present invention, it was unexpectedly discovered that it is possible to produce a process cheese which is significantly and substantially improved over those process cheeses produced by the prior art methods.

It is also noteworthy that one of the major and most critical problems confronting the industry is the handling or disposition of the quantity of "rework cheese" which is normally produced during the preparation of pasteurized process cheese. This "rework cheese" (also referred to herein as "rework" for the sake of brevity) generally consists of cheese trimmings, production line changeovers and/or cheese rejected from the production line because of improper weight or packaging or any quality defect. In the past, it has been the practice to reprocess the rework cheese by adding such rework to the natural cheese prior to the pasteurization (heating) step. However, one of the problems incurred in incorporating the rework cheese with the natural cheese and then heating the resultant mixture is that at levels greater than about 4% by weight rework, based on the combined total weight of the natural and rework cheeses, the resultant product is characterized by having a heavier body which hampers the pumping (that is, flowability) and "sheeting out" stages of the processing operation. Furthermore, in addition to these aforementioned undesirable characteristics, the final cheese product possesses a hard "short" body and a reduced melt-out (that is, spreadability) on cooking. Consequently, the industry is still faced with the problem of effectively utilizing the amount of rework produced under normal production conditions in order to prevent substantial rework inventories. Stated differently, it is a highly desirable objective to be able to reprocess the rework at a level which is equal to the rate of production of rework. As previously pointed out, however, when the rework level previously used was greater than about 4%, based on the total rework and natural cheese employed, the resultant pasteurized process cheese possesses highly undesirable characteristics such as those heretofore mentioned. Consequently, prior to the present invention, there was a definite need to effectively overcome the rework problem which plagued the industry.

Accordingly, it is one object of the present invention to provide an improved process for preparing pasteurized process cheese of better overall quality.

It is another object of the present invention to provide a process for preparing pasteurized process cheese which includes the utilization of rework pasteurized cheese at a level higher than that previously attainable by the prior art methods.

Still further objects and advantages of the present invention will become apparent to those skilled in the cheese art in view of the subsequent description and appended claims.

In general, the present invention provides, in part, a process for preparing (an improved) pasteurized cheese which comprises the steps of (1) forming an intimate admixture containing natural cheese, water, a fat-casein emulsifying agent such as an alkali metal phosphate, and a proteolytic enzyme such as one derived from fungal origin; (2) heating the resultant mixture for a period of time and at temperatures, for example, from 30 seconds to 60 minutes at about 150° F.–250° F., sufficient to emulsify and pasteurize the mixture to form a pasteurized process cheese melt; and (3) allowing the melt to cool and solidify, preferably by casting the melt into molds in order to ultimately form a solidified product.

Another embodiment of the present invention provides a proces for preparing a pasteurized process cheese from a combination of natural cheese and rework process cheese. Such process specifically comprises the steps of forming an intimate mixture containing natural cheese, rework pasteurized process cheese, water, fat-casein emulsifying agent, as mentioned above which is used in an amount of less than 5% by weight, based on the total weight of the final pasteurized product, and a proteolytic enzyme such as mentioned above; heating the resultant mixture, preferably with continuous mixing, for a period of time and at temperatures, for example, from 30 seconds to about 60 minutes at about 150° F. to about 250° F., sufficient to emulsify and pasteurize the mixture to form a pasteurized process cheese melt, and casting the melt into molds. The amount of rework that can be effectively used may be as high as 90%, preferably 5–40%, and more preferably from about 7% to about 25% by weight, based on the combined total weight of both the natural and rework process cheeses.

It has presently been unexpectedly discovered that when a proteolytic enzyme, hereinafter more specifically described, is incorporated in an intimate admixture containing natural cheese, an emulsifying agent, and water, and the admixture heated and then cast, the resultant pasteurized process cheese is characterized by having substantially improved properties as contrasted to the properties of the pasteurized process cheese produced without the utilization of such proteolytic enzyme. It was equally surprising to find that when substantial quantities of rework cheese are used in combination with natural cheese and such proteolytic enzyme, and the mixture pasteurized as a step in the overall cheese production process, the end cheese product was equivalent to and, in certain cases, better than process cheese prepared from natural cheese per se by the prior art methods. Additionally, it was found that these advantages could be obtained after the enzyme had been in contact with the cheese for only a short period of time, thereby minimizing proteolysis and not adversely affecting cheese flavor. These benefits, obtained by the use of proteolytic enzymes, are quite surprising in view of the fact that such enzymes have not been suggested for use during the pasteurization step, much less in combination with natural cheese. (While natural cheese is usually prepared by the use of an enzyme such as rennet to curdle the milk, the enzyme activity of the rennet appears to be substantially destroyed during the milk curdling and/or aging procedure due either to a change or breakdown of chemical structure of the rennet or for some other reason. This is probably the case since natural cheese prepared by curdling milk with rennet cannot be processed alone or with rework cheese into pasteurized process cheese with the ease and advantageous results obtained by the use of the processes of the present invention wherein a proteolytic enzyme is added to natural cheese prior to emulsification and pasteurization. This is confirmed by the experiments hereinafter referred to in the illustration examples.

It is believed that the proteolytic enzymes utilized in the processes of the present invention cause a chemical reaction to take place in the natural cheese alone or in combination with the rework cheese during the emulsification and pasteurization step and thereby provides a process cheese of improved properties, as previously mentioned herein. Also, it is believed that when rework cheese is employed such cheese is chemically "broken down" so that it effectively blends together with the natural cheese to provide a homogeneous mixture. Notwithstanding the foregoing, it is to be understood that this is merely a theory and the applicants do not wish to be limited in any way whatsoever to any theories as to the processes of their invention.

Any one or a combination of various proteolytic enzymes, singularly or in combination, which are effective at a pH of from about pH 4.0 to about pH 7.0 (since the natural and/or rework cheeses, in a 50% slurry, have a pH within 4.0 to 7.0) may be employed in the novel processes of the present invention. Proteolytic enzymes of animal origin, and proteolytic enzymes derived from bacterial or fungal sources, that is, cultures of microorganisms have been found to be suitable for the desired end results heretofore set forth. The animal-derived proteolytic enzyme useful is pepsin. Typical proteolytic enzymes derived from fungi such as *Aspergillus oryzae*, may also be employed in the novel processes described herein. Bacterially-derived enzymes are those isolated from the overall culture of bacterial organisms.

Of the various enzymes which may be employed in the novel processes, those proteolytic enzymes of bacterial or fungal origin, which have a specific activity (that is, protease units per gram of enzyme) of from about 10,000 to about 2,000,000, preferably from about 50,000 to about 990,000, are the preferred ones. (Such protease unit is defined as equal to 0.5 milligram of trichloroacetic acid-soluble tryosine liberated from casein on digestion for 10 minutes at 37° C.). The more preferred proteolytic fungal type enzyme is commercially available under the trademark Rhozyme P–11. Rhozyme P–11 is derived from the cultures of the fungus *Aspergillus flavus-oryzae* and has a specific activity of from about 100,000 to about 150,000 as defined above. Other preferred enzymes are produced by the following fungal organisms: various strains of

*Endothia parasitica,* various strains of *Mucor pusillus* Lindt, various strains of *Fomes pinicola* and various strains of *Fomitopsis pinicola.* A description and method of producing *Endothia parasitica* is described in U.S. Pat. 3,275,453 which is incorporated herein by reference. A description of *Mucor pusillus* Lindt and a method for production is described in U.S. Pat. 3,151,039 which is incorporated herein by reference. A culture of *Formitopsis pinicola* available to the public has been deposited in the American Type Culture Collection and has been designated ATCC 2036. A culture *Fomes pinicola* available to the public has been deposited in the American Type Culture Collection and designated ATCC 9399. Both of these organisms may be cultured on a 2% corn steep liquor, 5% sucrose, 0.3% yeast extract and inorganic sols at a pH adjusted to 5. Cooling is then conducted at 30° C. for 96 hours and 400 r.p.m. with aeration at the rate of 15 liters per minute. The enzyme is purified using a standard purification procedure. Another enzyme useful in this invention is "Microbial Rennet." This enzyme and the organisms that produce such enzyme is described in U.S. Pat. 3,151,039 which is incorporated herein by reference.

It is to be understood that in the practice of the instant invention, limitation to the aforesaid organism is not intended. It is specifically desired and intended to include subcultures, natural mutants, transduced derivatives, variants and the like, and mutants artifically produced from the aforesaid organisms by various means such as irradiation with X-rays or ultraviolet light, treatment with nitrogen mustards, and the like.

The quantity of enzyme employed in the processes of the present invention may be varied to some extent and depends primarily upon several factors such as the type and activity of the enzyme, the type of natural cheese being used alone or in combination with rework cheese (including the amount of rework cheese used) and the time of heating and the temperature to which the enzyme-cheese-water-emulsifying agent containing mixture is heated. However, it presently has been found that generally, the desired end cheese product can be made successfully when less than about 3% by weight, based on the weight of the fat-casein emulsifying agent, is utilized. Preferably, the enzyme is used in amounts of from about 0.005 to about 2.0% by weight, and more preferably from from about 0.01 to about 1% by weight, based on the weight of such emulsifying agent.

Generally, the amount of enzyme per gram of emulsifying agent is an amount to provide less than 12,000 casein units of protease activity, usually, from about 1 casein unit of protease activity to about 8,000 casein units of protease activity, preferably from about 1 unit of casein activity to about 2,500 units of casein activity more preferably 200 casein units of protease activity to about 2500 casein units of protease activity.

For example, the enzyme obtained Rhozyme P–11 is used, preferably in an amount to provide from about 6 casein units of activity to about 2500 units of activity program of the emulsifier; the enzyme obtained from *Mucor pusillus* Lindt is used in an amount to provide about 2 casein units of activity to about 2700 casein units of activity per gram emulsifying agent.

The proteolytic enzymes described herein can be incorporated in the natural cheese stocks or natural cheese and rework cheese stocks separately or in combination with the fat-casein emulsifying agents. It is preferred, however, to first mix such proteolytic enzymes with the emulsifying agents and then add the resulting mixture to the cheese stocks.

The main ingredient used to prepare pasteurized process cheese is natural cheese which is generally prepared by coagulating milk through the use of an enzyme such as Rennet (also known in the art as Rennin); (other ingredients such as lactic acid are also used, in certain instances, to prepare the natural cheese). More specifically, Rennet is added to milk and exerts a mildly proteolytic action on the casein and other proteins present therein. This breakdown of protein causes the solids in the milk to coagulate and form curds, and the milk is said to have curdled. (The Rennet is inactivated in the manner previously mentioned.) The solid curds are then freed from a predominantly aqueous low solids content suspension, generally known as "whey," and the curds are then mixed with a salt such as sodium chloride and formed into blocks or rounds and are finally cured, that is, aged for about 3 weeks to about 6 years or more, depending upon the type of cheese, at a temperature of 30° F.–70° F. to form natural cheese. Such processes for preparing natural cheese are well known in the art and, consequently, further description as to the preparation of natural cheese is omitted in order to avoid the enlargement of the present specification. Natural cheese, also referred to as an unprocessed cheese, has a tendency to spoil within a short period of time unless it is pasteurized according to those methods well known in the art.

In the production of processed cheese from natural cheese or mixture of natural cheese and rework cheese, it may be necessary to comminute or grind these materials prior to emulsification and pasteurization step in order to promote, for example, formation of a quick melt. The size of these cheese are relatively large and bulky and thus grinding to a lump size of, for example, less than ⅛"–¼" in the largest dimension is desirable.

As previously indicated herein, one ingredient which is utilized in the preparation of pasteurized process cheese is a fat-casein emulsifying agent. The emulsifiers according to the present invention also provide additional advantages such as providing a method of dispersing the enzyme in the cheese so that the enzyme uniformly attacks the cheese protein. Also it is believed that the emulsifier changes the form of the protein, making them more susceptible to the action of the enzyme. Finally the emulsifier serves as a buffer to keep the pH of the cheese constant, which favors action of the enzyme.

As examples of such emulsifying agents, there may be mentioned sodium aluminum phosphate, trisodium phosphate, sodium meta-phosphate, water soluble alkaline polyphosphates such as sodium polyphosphates of the formula $Na_5P_3O_{10}$, $Na_6P_4O_{13}$, $Na_9P_5O_{17}$, $Na_{11}P_9O_{28}$, $Na_{12}P_{10}O_{31}$ and $Na_{13}P_{11}O_{34}$. Additional emulsifying agents which may be employed herein include those "cheese melting salts" described in U.S. Pat. No. 2,564,374, which is incorporated herein by reference. Such melting salts consist of a crystalline alkali metal meta-phosphate (such as potassium metaphosphate) and a water-soluble salt from the group of alkali metal orthophosphate salts (for example, disodium phosphate), and calcium salts, and magnesium salts. Numerous types of fat-casein emulsifying agents may be utilized in the present invention processes and, consequently, the type of emulsifying agent is not to be considered as a critical limitation herein. The quantity of emulsifying agent is usually within the range of from about 0.05 to about 5.0% by weight, based on the final weight of the pasteurized cheese product. It is preferable to utilize an emulsifying agent within the range of from about 1% to about 3% by weight, based on the weight of the final cheese product.

It is also desirable in certain instances to incorporate, prior to the pasteurization step, a water-soluble flavoring salt such as sodium chloride, potassium chloride and the like in order to provide additional taste characteristics to the end product. The amount of such salt utilized is usually within the range of from about 0.001% to about 1.0%, preferably from about 0.1% to about 0.5% by weight, based on the total weight of the (final) pasteurized process cheese product. However, higher amounts, for example, 5%, of salt can be used if one so desires.

In certain instances, one may also employ a food dye in order to achieve a desired process cheese color. Such dyes are generally used in amounts less than 2%, preferably from about 0.01% to about 1.0%, by weight, based on the final weight of the process cheese. Such food dyes are exemplified by the dye sold under the trademark Anatto.

In addition to the aforementioned ingredients utilized in the preparation of a pasteurized process cheese, there may also be included the addition of a food preservative such as sorbic acid, which is used in an amount of from about 0.01% to about 1.0%, preferably from about 0.05% to about 0.1% by weight, based on the total weight of the final cheese product.

As previously mentioned water is used along with the above-mentioned ingredients in the production of processed cheese. The amount of water utilized in the preparation of pasteurized process cheese is dependent upon the type of cheese one desires to prepare. For example, if one desires to prepare "pasteurized process cheese," the largest amount of water which can be utilized is usually about 40% by weight based on the total weight of the final cheese product. When one desires to prepare a "pastuerized process cheese food," the amount of water used is usually from about 40% to about 44% by weight, based on the total weight of the final cheese product. When one desires to prepare a "pasteurized process cheese spread," the amount of water utilized is usually in the range of from about 44% to about 65% by weight, based on the total weight of the final cheese product. The moisture content of the final cheese product normally conforms to the standards set forth in the previously mentioned Federal Food, Drug and Cosmetic Act; however, if one so desires, a smaller amount of moisture or water may be utilized, for example, as low as 5–10% by weight, based on the weight of the final cheese product.

The specific sequence of adding the above-described ingredients to the vessel in which the mixing and pasteurization is carried out (generally referred to in the art as a "cooker") is not deemed critical and, consequently, the addition of said ingredients may be carried out in any desired sequence. However, it is normally convenient to initially feed the natural cheese (and rework process cheese, when used, concurrently) into the vessel or cooker and then add water thereto (or add water concurrently with the feeding of said cheese into said vessel) followed by the addition of the emulsifying agent and proteolytic enzyme of a mixture of such agent and enzyme. The aforementioned water-soluble flavoring salt, food preservative and food dye, if used, may then, respectively, be added in that order and the resultant mixture thoroughly admixed in order to promote a uniform distribution of the various ingredients therein. It is desirable during such addition (and in all cases) that the ingredients be continuously mixed together by means well known in the art.

The type of reaction vessel or "cooker" utilized to carry out the pasteurization step may be of any design as long as the desired end result is accomplished. Most cheese processors employ a vessel in which steam is directly injected into the resultant admixture in order to provide the necessary heat to carry out the pasteurization step. However, it is also within the scope of the present invention to employ a heat transfer-jacketed vessel such as a steam-jacketed vessel wherein the heat transfer means is circulated on the exterior of said vessel. It may be noted that when the direct steam injection type method is utilized, the amount of water initially added to the aforedescribed intimate admixture may be somewhat less than that amount ultimately required, since there is inherently some water condensation from the steam being injected into the ingredients.

After the addition of the aforementioned ingredients to the vessel or cooker and the thorough mixing thereof, the physical admixture is then pasteurized at various temperatures and times well known in the art. More specifically, certain minimum standards of pasteurization techniques have been established by the Federal Government under Title 21, U.S. Code, Part 19, Section 19.750 (a)2 wherein the minimum pasteurization time-temperature relationship, which is required for the cheese industry, is a minimum of 30 seconds of heating at a temperature of at least 150° F. Of course, the upper limit is contingent upon the practical and economic operation of the process and the temperature may range, for example, from about 150° F. to about 250° F. (or greater, for example 500° F.) for a period of from about 30 seconds to about 60 minutes, with the higher temperatures corresponding to the shorter times. As previously mentioned, it is important that the material undergoing pasteurization be continuously admixed during the pasteurization step in order to insure a uniformity of treatment. Furthermore, after the heating has been terminated, it is also within the scope of the present invention to include an additional mixing time, for example, from 1 to 15 minutes, if one so desires.

The aforementioned pasteurization step is generally carried out at atmospheric pressure, that is, about 15 lbs. per square inch absolute. If one so desires, however, the pasteurization step may be conducted at sub-atmospheric pressure, for example, from about 3 to about 15 lbs. per square inch absolute, or at super-atmospheric pressure, for example, from about 15 to about 200 lbs. per square inch absolute.

During the aforementioned pasteurization step the aforedescribed admixture ultimately is transformed into a uniform viscous pasteurized process cheese melt which, on completion of the pasteurization step, is ready to be cast into molds of different configurations in order to ultimately form a solidified product. It is usually desirable, after such casting operation has been undertaken, to refrigerate the molds containing the aforedescribed cheese melt; however, this refrigeration is not absolutely necessary in all cases. Such refrigeration may be carried out at temperature of from about −20° F. to about 50° F., preferably from about 10° F. to about 30° F., in order to retard spoilage.

A further understanding of the novel processes of the present invention will be obtained from the following example, which is intended to illustrate the invention but not to limit the scope thereof, parts and percentages being by weight unless otherwise specified.

EXAMPLE

Sixteen batch runs were carried with each batch containing approximately 800 grams of ground cheese having the composition as set forth in Table I. The separate batches were introduced individually into a preheated (150° F.) one-quart steam-jacketed Baker Perkins mixer. After mixing by means of a single blade mechanical agitator was begun, appropriate quantities of distilled water (to yield the end moisture content) were added followed by the addition of an enzyme-emulsifying agent mixture containing approximately (a) 5 grams of disodium phosphate duohydrate, (b) 5 grams of trisodium phosphate dodecahydrate, and (c) appropriate quantities (to yield the enzyme level specified in Table I—note Run Nos. 1–5 contained no enzyme) of a proteolytic enzyme commercially available under the trademark Rhozyme P–11, which is an enzyme of fungal origin as heretofore described and which had a specific activity of 110,000 protease units per gram of enzyme. (One protease unit is equal to 0.5 milligram of trichloroacetic acid soluble tyrosine liberated from casein on digestion for 10 minutes at 37° C.). The mixing of the ingredients was continued for about 5 minutes to achieve an end (or "cooker out") temperature of about 165–168° F. (It took approximately 8 and 10 minutes, respectively, to achieve an end temperature of about 175° F. and 186° F., note Runs No. 13–16.) The cheese temperature was monitored during mixing by means of a thermocouple which was inserted into the side of the mixing chamber and was connected to a temperature recorder. At the end of this pasteurization or heating and mixing period, which was conducted at atmospheric pressure, the separate samples were poured into individual Teflon® lined trays, covered with Teflon sheets, rolled out to approximately 1/8" thickness and then cooled down to refrigerator temperature of approximately 10° F. After the pasteurized process cheese melt had sufficiently solidified, it was cut into standard size slices, that is, a 3.5" x 3.5" square.

The results of the evaluation of the cheeses produced from Runs 1–16 are shown in Table I. The following evaluation methods were utilized to obtain the data and observations set forth in Table I.

METHODS OF EVALUATION

Moisture: Moisture levels of cheese samples were measured using a Cenco moisture balance with a 125 w. lamp. Lamp intensity was set at the maximum and samples were heated for 20 minutes.

pH: pH measurements were made on cheese slurries with a Beckman Zeromatic pH meter. Slurries were made by blending 50 grams of cheese with 50 grams of distilled water.

Penetration: A precision pentrometer equipped with a needle probe was used to measure the penetration of a stack of cheese slices. The probe was dropped from 100 millimeters, above the surface of the cheese and the penetration was reported in millimeters, mm. (This test indicates the softness of the cheese.)

Melting spread: Discs of cheese, 10 mm. in diameter were cut with a cork borer and were heated in a tray for 5 minutes above a boiling water bath. After heating, the tray was placed in a freezer to cool the samples. The spread of the cheese, not oil, was measured in millimeters, mm.

Oil-off: The degree of oil separation upon heating the cheese discs was observed and reported on the basis of numerical scale. A value of 3.0 indicates no oil separation while 0 represents considerable oil-off, which is undesirable.

Melt texture: Texture of melts were rated on a 0–3 scale. Melts with smooth surfaces and constant diameters were given high ratings, for example, 3.0. Those with a rough or curdled uneven appearance were given relatively lower ratings.

Break: Break characteristics were observed by bending the slices of cheese and determining the type of break obtained. A straight, clean break was excellent and in the numerical scale rated a value of 3; a jagged break was poor and rated a value of 0.

Grain: Cheese grain was rated during the break test and low values (lowest —0) indicate a rough coarse structure. High values (highest—3) indicate the presence of a good smooth "protein knit."

Slice separation: Low values (lowest—0) indicate slices that are very difficult to separate, as evidenced by breaks and broken corners of cheese. High values (highest—3) indicate that slices are easily separated without breaking or tearing.

Flowability: Low values (lowest—0) indicate a heavy viscous cheese melt in the cooker after the heating step. High values (highest—3) indicate an easily pourable cheese melt.

TABLE I

| Batch Run Number | Enzyme based on percent level in emulsifier | Natural[1] barrel | Natural[1] cheddar | Rework[2] | pH of cheese slurry | Cooker out temperature, °F |
|---|---|---|---|---|---|---|
| 1 | 0 | 50 | 50 | 0 | 5.6 | 167 |
| 2 | 0 | 50 | 40 | 10 | 5.7 | 167 |
| 3 | 0 | 40 | 35 | 25 | 5.5 | 167 |
| 4 | 0 | 30 | 20 | 50 | 5.8 | 168 |
| 5 | 0 | 20 | 10 | 70 | 6.0 | 168 |
| 6 | 0.1 | 50 | 50 | 0 | 5.7 | 167 |
| 7 | 0.5 | 50 | 50 | 0 | 5.8 | 168 |
| 8 | 1.0 | 50 | 50 | 0 | 5.4 | 168 |
| 9 | 1.0 | 50 | 40 | 10 | 5.8 | 165 |
| 10 | 1.0 | 40 | 35 | 25 | 5.9 | 168 |
| 11 | 1.0 | 30 | 20 | 50 | 5.6 | 167 |
| 12 | 1.0 | 20 | 10 | 70 | 6.0 | 167 |
| 13 | 0.5 | 50 | 50 | 0 | 5.8 | 175 |
| 14 | 0.5 | 40 | 35 | 25 | 5.7 | 175 |
| 15 | 0.5 | 50 | 50 | 0 | 5.7 | 186 |
| 16 | 0.5 | 40 | 35 | 25 | 5.7 | 187 |

| Batch Run Number | Moisture in final product, percent | Flowability of melt | Penetration Millimeters, mm. | Melt spread | Oil off | Melt text | Break | Grain | Slice separation |
|---|---|---|---|---|---|---|---|---|---|
| 1 | 40.0 | 1.75 | 10 | 24 | 2.0 | 2.0 | 2.25 | 2.0 | 2.0 |
| 2 | 40.0 | 1.50 | 9 | 21 | 1.25 | 1.50 | 1.50 | 1.75 | 1.0 |
| 3 | 39.5 | 1.50 | 7 | 16 | 1.0 | 1.25 | 1.0 | 1.0 | .75 |
| 4 | 39.8 | 1.00 | 5 | 13 | .75 | .75 | .50 | .75 | .50 |
| 5 | 39.1 | .50 | 4 | 11 | .50 | .25 | .25 | .25 | .25 |
| 6 | 39.7 | 2.5 | 14 | 28 | 2.5 | 2.5 | 2.75 | 2.5 | 2.75 |
| 7 | 40.1 | 3.0 | 18 | 36 | 3.0 | 3.0 | 3.0 | 3.0 | 3.0 |
| 8 | 40.0 | 3.0 | 21 | 41 | 3.0 | 3.0 | 3.0 | 3.0 | 3.0 |
| 9 | 40.1 | 3.0 | 20 | 38 | 3.0 | 3.0 | 3.0 | 3.0 | 3.0 |
| 10 | 40.1 | 3.0 | 18 | 35 | 3.0 | 3.0 | 3.0 | 3.0 | 3.0 |
| 11 | 39.5 | 2.75 | 16 | 25 | 2.75 | 2.75 | 2.75 | 2.75 | 2.75 |
| 12 | 39.9 | 2.50 | 13 | 20 | 2.75 | 2.75 | 2.75 | 2.50 | 2.50 |
| 13 | 44 | 3.0 | 23 | 42 | 3.0 | 3.0 | ([3]) | ([3]) | ([3]) |
| 14 | 44 | 2.75 | 18 | 34 | 3.0 | 2.75 | ([3]) | ([3]) | ([3]) |
| 15 | 60 | 3.0 | 26 | 43 | 3.0 | 3.0 | ([3]) | ([3]) | ([3]) |
| 16 | 61 | 3.0 | 18 | 30 | 2.75 | 2.50 | ([3]) | ([3]) | ([3]) |

[1] Both barrel and cheddar cheese prepared by the use of rennet as the enzyme-milk curdling agent.
[2] The rework consisted of 50% by weight process barrel cheese and 50% by weight process cheddar cheese.
[3] These tests are not applicable to the process cheese spread and food products.

As can readily be seen from the data set forth in Table I, the results of the utilization of a proteolytic enzyme in the preparation of pasteurized process cheese from natural cheese, either with or without the use of "rework" pasteurized process cheese, yields a process cheese which is a substantial improvement over the process cheeses produced by the prior art methods which did not use an enzyme (proteolytic). Specifically, it will be noted that in Run Nos. 1–5 no enzyme was added. In Run Nos. 6–8, the use of an enzyme at different levels significantly improved the overall characteristics of the end product. For example, the "penetration," which is an indication of softness, increased from a low of 10 mm. (Run No. 1—no enzyme) to 14, 18 and 21 mm. (respectively in Run Nos. 6, 7 and 8—enzyme present) which results in respectively, an improvement of 40%, 80% and 110% in softness. Similar improvements are also vividly apparent from the other data given and will not be specifically singled out for the sake of brevity.

Now referring to Run Nos. 2–5, it will be noted that various levels of "rework" cheese were incorporated in the overall process cheese preparation wherein no enzyme was used and the end product characteristics were progressively poorer as the percent rework was increased, as contrasted to Run No. 1 wherein no rework (and no enzyme) was used. By the same token, when an enzyme was used in Run Nos. 9–12, the end product characteristics were outstandingly improved as contrasted to the product characteristics of Run Nos. 2–5, both sets of Runs utilizing, respectively, the same levels of rework.

Run No. 12 in the aforesaid example was repeated with the exception that 100% rework constituted the cheese being pasteurized, that is, there was no Barrel or Cheddar cheese present; however, 1% by weight of the enzyme was present. The end product characteristics were similar to those original results obtained in Run No. 5. Furthermore, the resultant product taste was bitter and/or objectionable. Run No. 12 was further repeated utilizing an enzyme level of approximately 3%. The resultant product characteristics were similar to those characteristics shown for Run No. 3; however, the product taste was quite bitter and/or objectionable from a consumer point of view. In both repeats of Run No. 12, the end product was judged to be non-edible by a group consisting of twelve persons including both male and female. (The taste of the end product of Run Nos. 1–16 were all deemed satisfactory by this same group.) It can be seen, then, that the use of 100% rework level did not result in an improved product. Similar results were obtained when an enzyme obtained from *Mucor pumilus* Lindt was substituted in an equal amount based on the weight of the emulsifying agent for Rhozyme P–11 in the runs of Example 1.

Run No. 1 (no enzyme present) of the aforesaid example was repeated with the exception that the sole cheese component utilized was a natural cheese, Cheddar, produced by the method described in U.S. 3,275,453 (Example I, column 4, line 74, to column 6, line 51). The end process cheese product had substantially the same characteristics as disclosed for the original product of Run No. 1. Run No. 8 (1% enzyme level) of the aforesaid example was repeated with the exception that the sole cheese component utilized was the aforesaid U.S. 3,275,453 natural Cheddar cheese. The results of the repeat of Run No. 8 were similar to those results originally obtained in Run No. 8 as shown in Table I. These results of the repeats of Run Nos. 1 and 8, using the U.S. 3,275,453 natural cheese, were quite unexpected in view of the fact that the natural cheese described in U.S. 3,275,453 was prepared by the use of milk curdling enzyme which the patentee classified as a proteolytic enzyme, in place of rennet, for curdling milk. Thus, it is clear that it is necessary to incorporate a proteolytic enzyme into natural cheese obtained by curdling milk with an enzyme in order to obtain the improved results of this invention in the production of pasteurized process cheese. This is neither taught by or obvious from U.S. 3,275,453.

While the aforegoing description is directed primarily to the incorporation in the natural or rework cheese of the proteolytic enzyme prior to the heating (pasteurization) step, it is also within the scope of the present invention to add such enzyme during the heating step. However, if such addition is carried out during the heating step the amount of enzyme utilized is generally greater than 3.0% by weight, for example, about 5% or even as high as 10% (or more) by weight, based on the weight of the emulsifying agent. This is due to the cheese temperature in the cooker, partially inactivating the enzyme prior to its action on the natural cheese or mixture of the natural cheese and rework. Furthermore, if one desires to add such enzyme during the heating step, the overall heating period is extended, for example, from 5 minutes to 30 minutes, in order to insure necessary activity of the enzyme. Consequently, the heating temperature is generally decreased, for example, from 180° F. to 165° F., when the heating period is prolonged as previously mentioned in the earlier part of the specification.

Regardless at which point the enzyme is added, the beneficial results in accordance with this invention are obtained if the enzyme is in contact with the cheese for only a short period of time, i.e., from about 45 seconds to about 600 seconds. However, the enzyme may be in contact with the cheese for as long as 30 minutes, even up to 60 minutes without any detrimental effects on the cheese. Consequently, the action of the enzyme on cheese proteins is limited which provides the proper amount of degradation of the proteins to result in optimal functional properties of the cheese (flowability, melt out, etc.) without undesirable characteristics such as bitter off-flavors.

An additional surprising facet of the present invention was the discovery that the afore-described proteolytic enzyme and emulsifying agent (or agents) form a novel cheese additive for the preparation of process cheese. More specifically, when these two ingredients are mixed together prior to the incorporation into the natural cheese or a mixture of natural cheese and rework, and then the overall mixture is subjected to heating and pasteurization, the end process cheese characteristics are superior than that cheese produced by the process wherein the enzyme and such agent are added separately to the cooker. When Run Nos. 8 and 9 of the foregoing example were repeated with the exception that the enzyme and emulsifying agents were added separately (instead of as a mixture as originally used in Run Nos. 8 and 9) the end results were similar to those results (or values) originally obtained in Run No. 6 as shown in Table I. (In other words, the results for the original Run Nos. 8 and 9 are superior to the results obtained when Run Nos. 8 and 9 were repeated and wherein the proteolytic enzyme and emulsifying agent were added separately.)

In order to further illustrate this aspect of the present invention, Run Nos. 8 and 9 were again repeated. However, in repeating the runs, the emulsifying agents were either (a) intimately admixed with the proteolytic enzyme prior to addition to the ground cheese in the Baker Perkins mixer or (b) were added separately and individually to the cheese in such mixer after which the enzyme was added. (NOTE: the following emulsifying agents were substituted for the emulsifying agents set forth in the first paragraph of the foregoing example.)

(I) Emulsifying agent:
   (a) 6 grams—sodium metaphosphate [1]
   (b) 4 grams—trisodium phosphate anhydrous
(II) Emulsifying agent:
   (a) 4 grams—sodium metaphosphate [1]
   (b) 6 grams—disodium phosphate anhydrous
(III) Emulsifying agent:
   (a) 4 grams—sodium metaphosphate [1]
   (b) 6 grams—trisodium phosphate anhydrous

[1] Crystalline Form II as described in "Phosphorus and Its Compounds," J. R. Van Wazer, volume I, page 607, Interscience Publishers, Inc., New York; 1958 and which publication is incorporated herein by reference.

In the repeats of Run Nos. 8 and 9 utilizing the three different sets of emulsifying agents (i.e. I, II and III), the characteristics of the end process cheese obtained when utilizing an admixture of the emulsifying agents and the enzyme were superior to those characteristics of the process cheese obtained when utilizing the emulsifying agents separately and individually (that is, added separately to the cooker and not admixed with the enzyme). More specifically, the repeats of Run Nos. 8 and 9 when using a physical admixture of the above-described emulsifying agents and enzyme yielded results comparable to those set forth in Table I for Run Nos. 8 and 9, whereas when the emulsifying agents and enzyme were added separately to the cooker in the repeat of Run Nos. 8 and 9, the end results were comparable to those results obtained in Run No. 6 as shown in Table I. Thus it can readily be seen that this enzyme-emulsifying agent mixture results in an even greater improved process cheese product as contrasted to when the enzyme and such agents are used separately. However, the utilization of the enzyme either with or without prior admixing with such emulsifying agent, provides a process cheese of superior quality as contrasted to the prior art cheeses produced by a process which did not use an enzyme in the pasteurization step. The reasons for such improved results are not known at the present time.

As a preferred embodiment of the present invention there is provided a composition of matter comprising (a) an emulsifying agent selected from the group of alkali metal metaphosphates (such as sodium metaphosphate), disodium phosphate anhydrous, trisodium phosphate anhydrous, and mixtures thereof, and (b) a proteolytic enzyme as hereinbefore described. The insoluble alkali metal metaphosphate is used in amounts of from about 20% to about 80%, preferably from about 50% to about 60%, by weight based on the total weight of the emulsifying agents used. The disodium phosphate anhydrous is used in an amount of from about 30% to about 90%, preferably from about 50% to about 70%, by weight based upon the total weight of the emulsifying agents used. The trisodium phosphate anhydrous is utilized in an amount of from about 20% to about 80%, preferably from about 40% to about 60%, by weight based upon the total weight of the emulsifying agents utilized. It is to be noted that the preferred ranges of the aforesaid emulsifying agents refer to such agents when used either singularly or as a mixture of two such agents. The amount of enzyme utilized in the aforesaid composition of matter falls within those ranges previously mentioned, for example, from about 0.005 to about 2.0% by weight based on the total weight of the combined emulsifying agents. This is generally from about 1 casein unit of protease activity per gram of the emulsifying agent to 8,000 casein units of protease activity per gram of the emulsifying agent.

While the above described preferred embodiment of the present invention covers certain emulsifying agents it is to be understood that various emulsifying agents (in addition to those set forth in the earlier part of this specification) may be utilized in the novel compositions. For example, the emulsifying agent may be one or any mixture of two or more of the following materials: monosodium phosphate, disodium phosphate, dipotassium phosphate, trisodium phosphate, sodium metaphosphate (sodium hexametaphosphate) sodium acid pyrophosphate, tetrasodium pyrophosphate, sodium aluminum phosphate, sodium citrate, potassium citrate, calcium citrate, sodium tartrate, and sodium potassium tartrate. The quantity of emulsifying agent (which includes mixtures of emulsifying agents) in the above described novel compositions may range from as low as 90% to as high as 99% or more by weight, based on the total weight of the composition. Stated differently, the enzyme (while previously mentioned as used in a range of 0.005 to about 2.0% by weight based on the total weight of the combined emulsifying agents) may be used in higher amounts than even previously mentioned, i.e. (10%, 10,000 casein units of protease activity per gram of the emulsifying agent), if there are no adverse effects when utilized in the overall preparation of process cheese. It is preferred, however, that the enzyme be utilized in amounts of less than 5% to 10%, more preferably 3%, by weight based upon the total weight of emulsifying agent.

In order to point out the criticality of the utilization of both the emulsifying agent and proteolytic enzyme, Run No. 8 was again repeated with the sole exception that no emulsifying agents were used. The end results of this repeat of Run No. 8 were similar to the data obtained from Run No. 5 set forth in Table I. More specifically the preparation of a process cheese with only the proteotytic enzyme heretofore described and without an emulsifying agent resulted in a very poor product and one which was considered unacceptable.

We claim:

1. A composition of matter for use in preparing process cheese from natural cheese consisting essentially of an emulsifying agent selected from the group consisting of monosodium phosphate, disodium phosphate, dipotassium phosphate, trisodium phosphate, sodium metaphosphate, sodium hexametaphosphate, sodium acid pyrophosphate, tetrasodium pyrophosphate, sodium aluminum phosphate, sodium citrate, potassium citrate, calcium citrate, sodium tartrate, sodium potassium tartrate and mixtures thereof, said emulsifying agent being present in an amount of at least 90% by weight of the composition, and a proteolytic enzyme produced by an organism selected from the group consisting of various strains of *Endothia paracitica*, various strains of *Mucor pusillus* Lindt, various strains of *Fomes pinicola* and various strains of *Fomitopsis pinicola*, said proteolytic enzyme being present in an amount to provide from about 1 casein unit of protease activity to about 8,000 casein units of protease activity per gram of the emulsifying agent.

2. A composition of matter according to claim 1 wherein said emulsifying agent is selected from the group consisting of sodium metaphosphate, sodium hexametaphosphate, disodium phosphate, trisodium phosphate and mixtures thereof.

3. The composition as set forth in claim 2 wherein (a) the emulsifying agent is a mixture of from about 20% to about 80% by weight of sodium metaphosphate and from about 30% to about 90% by weight of disodium phosphate anhydrous and (b) the proteolytic enzyme has from about 10,000 to 990,000 casein units of protease activity per gram of the enzyme and is present in an amount to provide about 200 casein units of protease activity to about 2,500 casein units of protease activity per gram of the emulsifying agent.

4. The composition as set forth in claim 2 wherein the emulsifying agent is a mixture of from about 20% to about 80% by weight of sodium metaphosphate and from about 20% to about 80% by weight of trisodium phosphate anhydrous.

5. A composition of matter for use in preparing process cheese from natural cheese consisting essentially of an emulsifying agent selected from the group consisting of sodium aluminum phosphate, sodium citrate, potassium citrate, calcium citrate, sodium tartrate, sodium potassium tartrate and mixtures thereof, said emulsifying agent being present in an amount of at least 90% by weight of the composition, and a proteolytic enzyme produced by an organism selected from the group consisting of various strains of *Aspergillus flavus-oryzae*, various strains of *Endothia paracitica*, various strains of *Mucor pusillus* Lindt, various strains of *Fomes pinicola* and various strains of *Fomitopsis pinicola*, said proteolytic enzyme being present in an amount to provide from 1 casein unit of protease activity to about 8,000 casein units of protease activity per gram of the emulsifying agent.

References Cited
UNITED STATES PATENTS

| | | | |
|---|---|---|---|
| 3,451,935 | 6/1969 | Roald et al. | 195—63 X |
| 3,063,911 | 11/1962 | Tanaka et al. | 195—66 X |
| 3,461,074 | 8/1969 | Schwalley | 252—135 X |

FOREIGN PATENTS

| | | | |
|---|---|---|---|
| 20,291 | 1960 | Germany | 195—63 |

A. LOUIS MONACELL, Primary Examiner

D. M. NAFF, Assistant Examiner

U.S. Cl. X.R.

99—115